(12) United States Patent
McCavit et al.

(10) Patent No.: US 7,148,628 B2
(45) Date of Patent: Dec. 12, 2006

(54) PHOTOSENSITIVE CONTROL WITH DYNAMIC CALIBRATION

(75) Inventors: Kim Irwin McCavit, Saint Joseph, MI (US); Roger Dennis Cornett, Bowling Green, KY (US); William C. Raper, Sparta, TN (US)

(73) Assignee: Desa IP, LLC, Miami, FL (US)

( * ) Notice: Subject to any disclaimer, the term of this patent is extended or adjusted under 35 U.S.C. 154(b) by 131 days.

(21) Appl. No.: 10/902,759

(22) Filed: Jul. 30, 2004

(65) Prior Publication Data

US 2006/0025949 A1 Feb. 2, 2006

(51) Int. Cl.
*H05B 37/02* (2006.01)

(52) U.S. Cl. .................. 315/158; 315/149; 315/311; 315/307; 315/320

(58) Field of Classification Search .................. None
See application file for complete search history.

(56) References Cited

U.S. PATENT DOCUMENTS

| | | | |
|---|---|---|---|
| 4,588,926 A | 5/1986 | Pezzolo | |
| 5,195,016 A | 3/1993 | Powers | |
| 5,442,177 A | 8/1995 | Boulos et al. | |
| 5,656,928 A * | 8/1997 | Suzuki et al. | 324/71.1 |
| 5,663,613 A * | 9/1997 | Yamashita et al. | 315/308 |
| 5,679,953 A * | 10/1997 | Ananth et al. | 250/338.1 |
| 5,773,816 A * | 6/1998 | Grodevant | 250/214 R |
| 5,892,331 A | 4/1999 | Hollaway | |
| 5,990,628 A | 11/1999 | Birrell | |
| 6,160,352 A | 12/2000 | Steinel | |
| 6,455,839 B1 * | 9/2002 | O'Connor et al. | 250/221 |
| 6,580,221 B1 | 6/2003 | Hutzler et al. | |

* cited by examiner

*Primary Examiner*—Tuyet Thi Vo
(74) *Attorney, Agent, or Firm*—John F. Salazar; Middleton Reutlinger

(57) ABSTRACT

A method and circuit arrangement dynamically calibrate a photosensitive control for a light source that includes a voltage divider circuit coupled to a resistive light detector and configured to output to a comparison circuit a variable voltage signal that varies with the resistance of the resistive light detector. To calibrate the photosensitive control, a variable impedance circuit in the voltage divider circuit is adjusted to null out any changes in voltage caused by feedback from the controlled light source. The amount of correction is proportional to the amount of light feedback. Based on the amount of correction needed, a new reference voltage is selected that will accurately detect the next dusk to dawn transition while the light feedback is present.

33 Claims, 3 Drawing Sheets

PHOTOSENSITIVE CONTROL WITH DYNAMIC CALIBRATION

FIELD OF THE INVENTION

The invention is generally directed to the control of a light source responsive to ambient light.

BACKGROUND OF THE INVENTION

Photosensitive controls are utilized in a number of environments where it is desirable to turn a light source on or off depending upon the amount of ambient light. For example, in landscape lighting applications, it may be desirable to automatically turn lights on at dusk and turn lights off at dawn, or alternatively, after a fixed number of hours after dusk. In addition, it may be desirable in some motion sensing or security applications to sense the amount of ambient light to prevent a motion-sensitive light from turning on during the day. One challenge that is encountered with respect to photosensitive controls, however, results from the feedback of light from a controlled light source to the light detector used in determining the ambient light level. In some photosensitive controls, for example, a light detector output is compared to a static threshold that the light source is turned on when the ambient light falls below that threshold, and turned off when the ambient light rises above that threshold. However, when a light source is turned on, a portion of the generated light may be detected by the light detector, and may cause the detector input to rise above the static threshold, and cause the photosensitive control to turn the light back off. In some instances, the light source may flicker or repeatedly cycle on and off as a result of the feedback of light from an activated light source.

Some attempts to minimize the effect of feedback have included shielding a light detector or otherwise placing the light detector in a location that minimizes the amount of light from the controlled light source that is fed back to the detector. However, depending upon where the light source and light detector are installed, surrounding structures such as walls and other reflective surfaces may nonetheless reflect light from the light source back to a light detector. As a result, the amount of light feed back to a light detector may vary from installation to installation, and is thus difficult to eliminate through shielding or placement of the light detector.

Additional attempts to minimize the effects of feedback include using hysteresis to set different on and off thresholds, thus requiring a greater amount of ambient light to be detected to turn a light source off than that used to turn the light source on. It has been found, however, that increasing the "window" between on and off thresholds can inhibit accurate dawn detection, particularly on overcast days.

Other attempts to minimize the effects of feedback include dynamically setting thresholds based on the amount of ambient light sensed by a light detector. One conventional implementation, for example, monitors the infrared output of a fluorescent light and sets an off threshold based upon the amount of infrared light sensed after the fluorescent light is turned on, typically after waiting until the rate of change of the infrared output has decreased and the output has stabilized. Also, in this implementation, a rate of change of the light detector output may be used along with the absolute output to minimize the effects of rapid changes in the light detector output.

One problem associated with the aforementioned implementation, however, is that sensing the rate of change of a light detector output typically requires relatively complex processing. Moreover, sensing the rate of change may limit the overall responsiveness of the light detection circuit.

Therefore, what is needed is a simple and responsive photosensitive control that reduces the adverse effects of feedback from a controlled light source.

SUMMARY OF THE INVENTION

The invention addresses these and other problems associated with the prior art by providing a method and circuit arrangement that dynamically calibrates a photosensitive control for a light source. In particular, a photosensitive control consistent with the invention includes a voltage divider circuit coupled to a resistive light detector and configured to output to a comparison circuit a variable voltage signal that varies with the resistance of the resistive light detector. To calibrate the photosensitive control, a variable impedance circuit in the voltage divider circuit including, for example, a variable resistor, is adjusted to bias the variable voltage signal.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
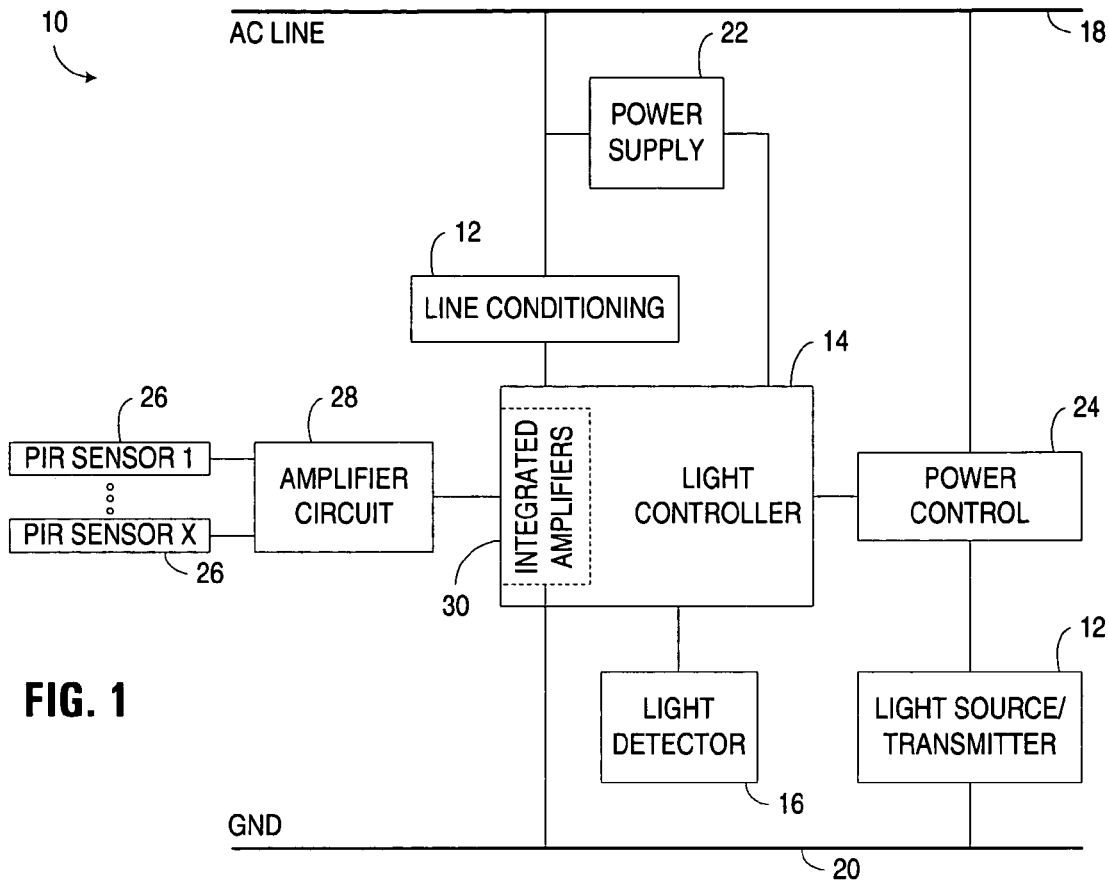
FIG. 1 is a block diagram of a photosensitive control for a light source consistent with the invention.

Turning to the drawings, wherein like numbers denote like parts throughout the several views, FIG. 1 illustrates a photosensitive control 10 consistent with the invention. Photosensitive control 10 is used to control a light source 12, which may include, for example, one or more incandescent or fluorescent light sources, among other sources of the light. In the alternative, control 10 may be used to power a wireless transmitter such as an RF transmitter for activating a remote light source in response to a logical activation signal. Control 10 includes a light controller or processor 14 to which is coupled a light detector 16. Light controller 14 may be implemented, for example, as an integrated circuit chip, while light detector 16 may be implemented using any known photosensitive detector or sensor, e.g., a photoconductive sensor such as a cadmium sulfide (CdS) detector, photodiode, phototransistor, etc.

In the illustrative embodiment, light detector 16 is implemented as a resistive light detector, wherein the resistance or impedance of the detector varies with the amount of light incident on the detector. Other light detector implementations may be used in the alternative.

AC power to photosensitive control 10 is provided via lines 18, 20, with a power supply 22 used to regulated and convert the AC power to DC power for use by controller 14. The device may also be DC, battery, solar powered, etc. in which case a simpler power supply may be used, or the power supply may be eliminated completely if unnecessary. A power control block 24, e.g., a relay or other switching device, is coupled between lines 18, 20 in series with light source 12, and is controlled by light controller 14 to selectively power light source 12.

In the illustrative embodiment, photosensitive control 10 additionally has motion sensing capability, whereby one or more motion sensors 26, e.g., passive infrared (PIR) sensors, are coupled to a network of cascaded amplifiers, e.g., including an external amplifier circuit 28 and additional integrated amplifiers 30 in light controller 14.

It may also be desirable in some implementations to provide a line conditioning circuit 32 for the purpose of providing light controller 14 with a time base from the AC power lines 18, 20. The time base may be used for timing on and off times, as well as for sensing power fluctuations or failures, e.g., due to electrical storms or other power outages, and thereby modify the operation of the photosensitive control based upon such detected fluctuations.

Photosensitive control 10 may be used in a wide variety of applications, and may utilize a number of known functions in the control of a light source consistent with the invention. For example, light controller 14 may be configured to activate a light source responsive to motion detected via one of sensors 26, and thereafter deactivate the light after expiration of a fixed timer. Furthermore, activation of the light source may further be conditioned upon the level of ambient light so that the light source will not be turned on in response to detected motion during the daytime. It may also be desirable to provide a manual override function whereby the light source may be activated irrespective of whether motion is sensed.

It will be appreciated that the invention may be utilized in a wide variety of other photosensitive control applications consistent with the invention. For example, the invention may be utilized in any application where it is desirable to control the activation of a light source based upon ambient light level, including non-motion sensing applications.

Figure 2:
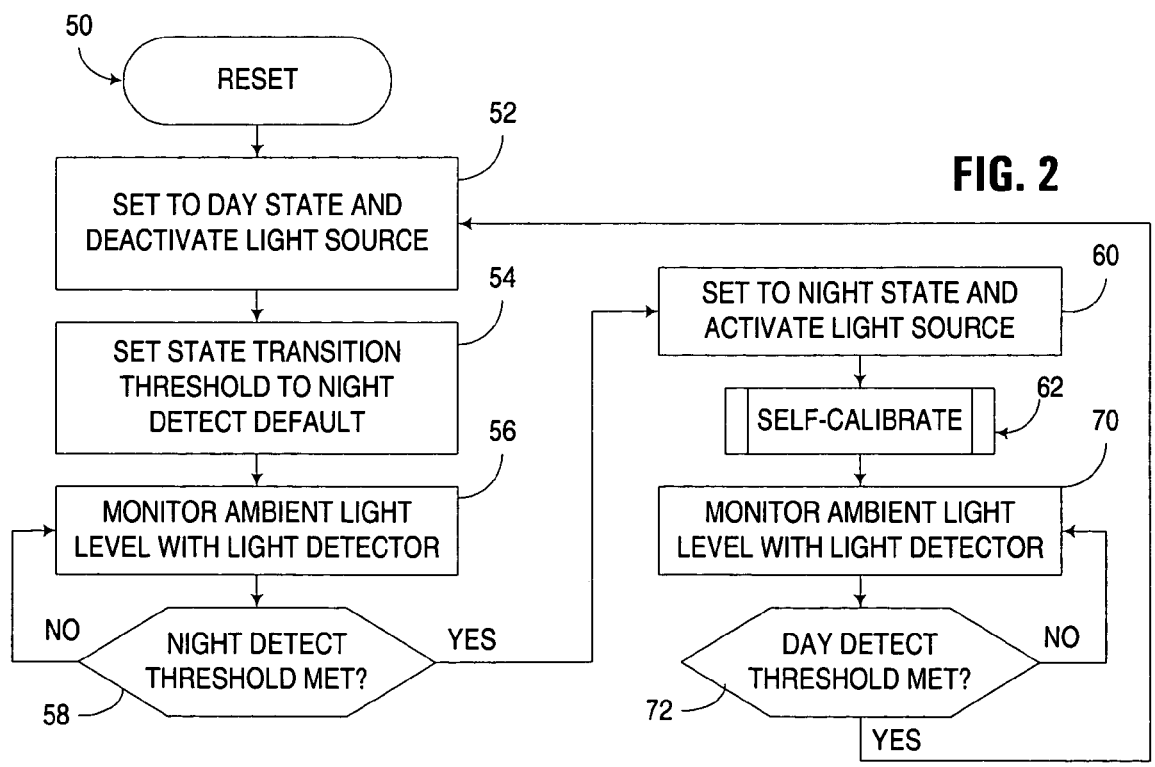
FIG. 2 is a flowchart illustrating exemplary steps utilized in a reset routine executed by the photosensitive control of FIG. 1.

Now turning to FIG. 2, an exemplary reset routine 50, executed by light controller 14 upon initial reset and power up of light controller 14, is illustrated in greater detail. Routine 50 begins in block 52 by initially setting the controller to a "day" or off state and deactivating the light source. Control then passes to block 54 to set a state transition threshold to a night detect threshold, i.e., a level of detected ambient light below which the photosensitive control will transition from a day (off) to night (on) state. In the illustrative embodiment, it is assumed that with the light source deactivated in such a state, the amount of extraneous ambient light that is not reflective of the time of day will be negligible, so a default, static threshold is selected for the night detect threshold. In other implementations, however, it may be desirable to dynamically generate the night detect threshold instead.

Next, control passes to block 56 to monitor the ambient light level with the light detector, and then to block 58 to determine whether the night detect threshold has been met. If the threshold is not met, light controller 14 continues to monitor the ambient light level by returning control to block 56.

Otherwise, if the night detect threshold has been met (e.g., where the ambient light level falls below the night detect threshold), control passes to block 60 to set the controller in a night (on) state and active the light source. Control then passes to block 62 to perform a self-calibrate routine, which dynamically sets a day detect threshold that is used in determining when to switch back to the day (off) state.

Figure 3:
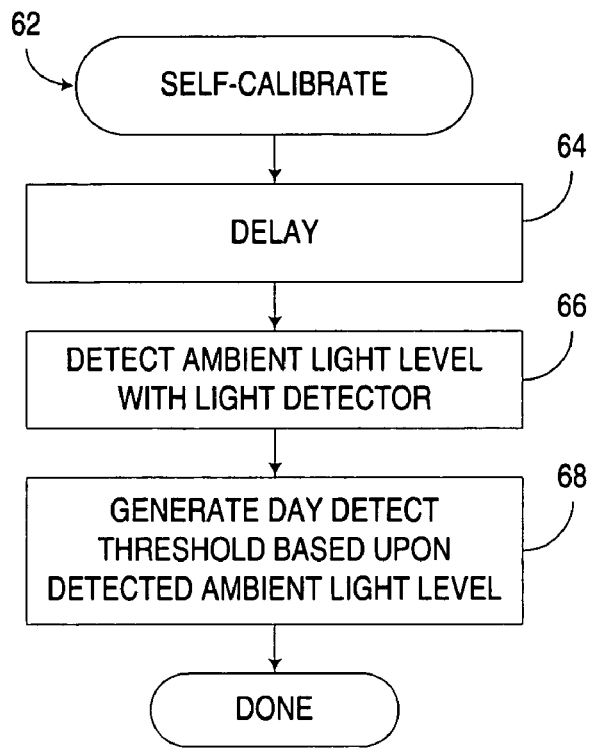
FIG. 3 is a flowchart of the self-calibrate routine referenced in FIG. 2.

FIG. 3, for example, illustrates one suitable implementation of self-calibrate routine 62. In particular, route 62 begins in block 64 by initiating a delay for a predetermined amount of time to allow the light source to reach a relatively steady state, e.g., about 3 to 5 seconds. Next, block 66 detects the ambient light level with the light detector, and thereafter block 68 dynamically generates the day detect threshold based upon the detected ambient light level.

Returning to FIG. 2, once the day detect threshold has been dynamically generated, control passes to block 70 to monitor the ambient light level with the light detector. Based upon whether the day detect threshold is met, block 72 either returns control to block 70 (if the threshold is not met) or passes control to block 52 (if the threshold is met), the latter condition returning the controller to the day (off) state and deactivating the light source.

It will be appreciated that routine 50 may directly active a light source, or in the alternative, may simply enable activation of the light source, where the actual activation of the light source is further conditioned on additional criteria. For example, in a motion sensing implementation, it may be desirable for routine 50 to simply enable and disable activation of a light source during the night and day states, respectively, so that the light source will be turned on in response to motion detected by a motion sensor only when the controller is in the night state.

It will also be appreciated that, while self-calibrate routine 62 is shown being executed to dynamically generate a threshold only after the controller transitions from an "off" state to a "on" state, routine 62 may also be executed to generate a threshold in a number of different circumstances. For example, routine 62 may be executed when switching a light source between different luminance levels, e.g., when switching between bright and dim modes. Also, as noted above, routine 62 may be executed upon switching from an "on" state to an "off" state, e.g., as opposed to setting a static threshold as is done in block 54 of routine 50. Other modifications will be apparent to one of ordinary skill in the art having the benefit of the instant disclosure.

Figure 4:
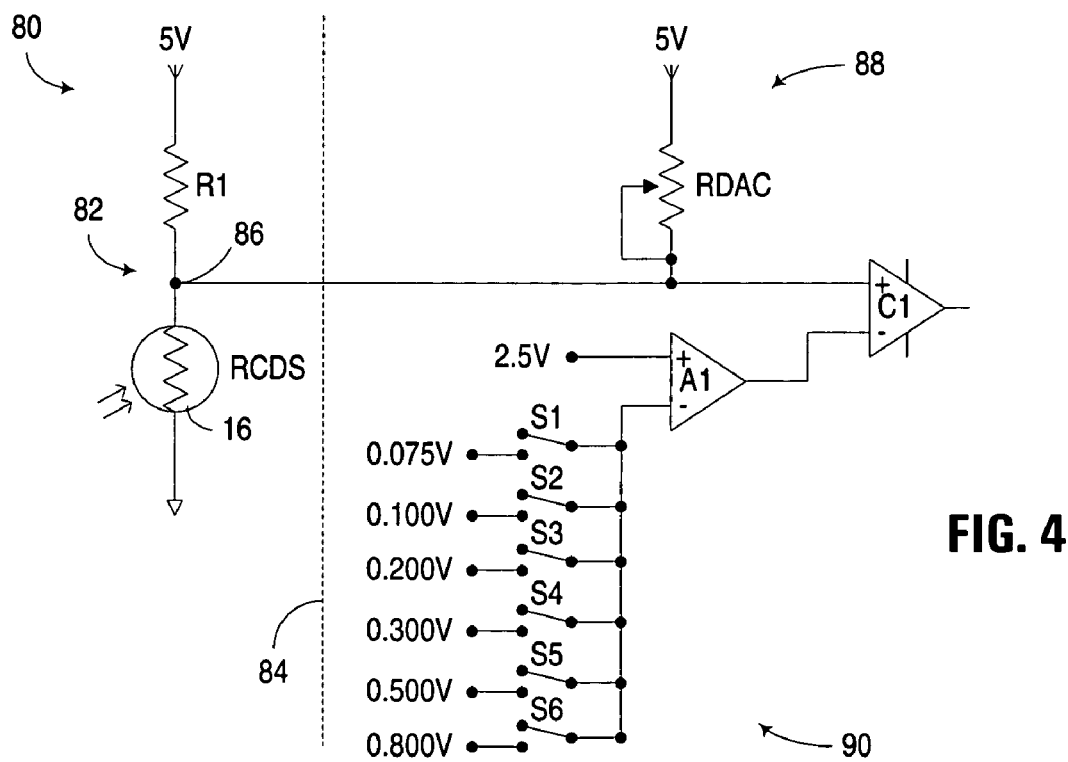
FIG. 4 is a block diagram of an exemplary implementation of a calibration circuit utilized in the photosensitive control of FIG. 1.

FIG. 4 next illustrates one specific implementation of a calibration circuit 80 consistent with the invention. FIG. 4, in particular, illustrates an exemplary implementation partially integrated into light controller chip 14, with the components to the right of dashed line 84 being integrated into light controller chip 14, and the components to the left of line 84 being disposed external to the chip. Calibration circuit 80 includes a voltage divider circuit 82 coupled to one input of a comparison circuit, e.g., coupled to the positive (+) input of a comparator C1.

Voltage divider circuit 82 is coupled between power (VDD) and ground, and includes a common node 86 coupled to the positive input of comparator C1. Coupled between VDD and common node 86 is a variable impedance circuit 88 comprising a parallel arrangement of a fixed resistor RI and a variable resistor RDAC. Light detector 16, implemented as a resistive CdS detector (denoted in FIG. 4 as RCDS), is coupled between common node 86 and ground. As will be discussed in greater detail below, resistors R1 and RDAC provide a variable impedance capable of biasing a variable voltage signal that varies with the level of ambient light sensed by light detector 16 and that is output to the positive input of comparator C1.

Coupled to the negative (−) input of comparator C1 is a reference signal generation circuit 90 comprising an adder A1 and a series of switches S1–S6. Adder A1 has a positive (+) input coupled to a fixed reference voltage, e.g., VDD/2 volts, or 2.5 volts where VDD=5 volts, for example. The negative (−) input to adder A1 is coupled to a plurality of discrete offset voltages via switches S1–S6. Each switch is a digitally-controlled switch which, when closed, passes one of a plurality of offset voltages to adder A1 and thus decrease the reference voltage output thereby. In the illustrative embodiment, for example, six discrete offset voltages may be selected via switches S1–S6, including 0.075 volts, 0.100 volts, 0.200 volts, 0.300 volts, 0.500 volts, and 0.800 volts. It will be appreciated that other offset voltage generating circuits, e.g., that generate non-discrete offset voltages, may be used in the alternative.

Also in the illustrative implementation, variable resistor RDAC is implemented as a digitally-controlled resistor, e.g., a resistive digital to analog converter (RDAC) including a R-2R ladder arrangement, as is well known in the art. In the illustrative embodiment, for example, the RDAC may be implemented as a 10-bit converter having a maximum resistance of about 250 KOhm. The impedance of the R-2R ladder may be controlled, for example, by a digital counter. The impedance of the RDAC would then be directly proportional to the count value chosen by this counter. It may also be desirable to implement resistor R1 with a resistance of about 39 KOhm, such that the effective resistance of the parallel configuration of resistors R1 and RDAC has a maximum resistance of about 33.7 KOhm. It will be appreciated, however, that other circuitry capable of providing a variable impedance to bias the variable voltage signal generated by light detector 16, e.g., using various combinations of other resistors, capacitors, inductors, current sources, active components, etc., may be used as an alternative to the parallel arrangement of resistors R1 and RDAC.

During normal daytime operation, the impedance of RDAC would be set to maximum and switches S1 through S6 would be open. As the ambient light levels decrease, the impedance of RCDS will increase and eventually the voltage at node 86 will rise above the reference voltage $V_{DD/2}$, or for example, 2.5V and the output of comparator C1 will change states. Assuming that the external light source is turned on at the time, light feedback will decrease the impedance of RCDS and the voltage at node 86 will decrease to an extent that depends directly upon the amount of light that is fed back. In general, calibration circuit 80 operates by first adjusting resistor RDAC to bias the variable voltage signal at node 86 until the variable voltage is greater than or equal to 2.5 volts. This action effectively cancels the error caused by any light feedback. Thereafter, the reference voltage is generated based upon the count in the RDAC used to bias the variable voltage signal. The offset is selected for different ranges of count values, although alternate formulas or algorithms may be utilized in the alternative. For example, it may be desirable to provide an offset of 0.075 volts for a count value below 21, an offset voltage of 0.100 volts for a count between 21 and 30, an offset voltage of 0.200 volts for a count between 31 and 50, an offset voltage of 0.300 volts for a count value between 51 and 100, an offset voltage of 0.500 volts for count value between 101 and 225, and an offset voltage of 0.800 volts for a count value greater than 226.

As such, calibration circuit 80 generally provides a variable threshold based upon the sensed ambient light. Of note, this variable threshold may also be considered to be a variable window between the switch off and switch on thresholds.

It will be appreciated that the profile of such a variable window may vary in different implementations of the invention. Generally, it is desirable in many implementations to set the comparator offset voltage to be large enough to provide adequate head room when the feedback luminance is relatively small, but is desirably is kept as small as possible to minimize errors when the feedback luminance is relatively large.

Figure 5:
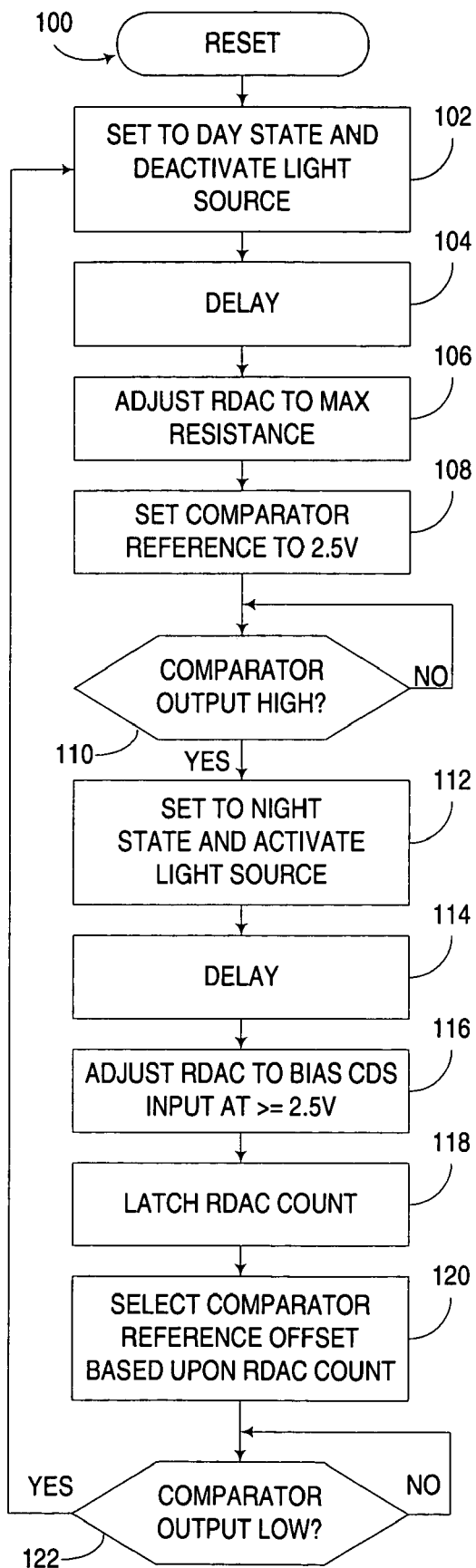
FIG. 5 is a flowchart illustrating exemplary steps utilized in a reset routine executed by the photosensitive control of FIG. 1.

FIG. 5 next illustrates an exemplary reset routine 100 that may be executed by light controller 14 upon initial power up when the calibration circuit of FIG. 4 is utilized in a photosensitive control consistent with the invention. It will be appreciated that routine 100 may be implemented at least partially in software or via other programmable circuitry.

Routine 100 begins in block 102 by setting the controller to a day state and deactivating the light source. Thereafter, a delay is implemented in block 104 to allow the light source to fully shut off. Next, block 106 adjusts the RDAC resistor to its maximum (default) resistance, and block 108 sets the comparator reference voltage to 2.5 volts, i.e., with no offset voltage. Blocks 106 and 108 therefore have the functionality of setting for the light controller a default night detect threshold.

Next, block 110 waits until the comparator output goes high, indicating that the ambient light level has fallen below the detect threshold. Control then passes to block 112 to set the controller to night state, and activate the light source.

Next, block 114 waits a predetermined time period, e.g., about 3 to 5 seconds, and block 116 then progressively adjusts the RDAC to bias the variable voltage input at comparator C1 to the largest value at which the variable voltage is about 2.5 volts (e.g., the last value before the comparator changes state). Block 118 then latches the count value for the RDAC resistor, and based upon this latched value, block 120 selects the comparator reference offset value as described above, and activates the appropriate switch S1–S6.

Block 122 then waits until the comparator output goes low, indicating that ambient light level has increased above the threshold dynamically generated in blocks 116–120. Once the comparator output is detected at low, block 122 then passes control to block 102 to set the light controller to day state and deactivate the light source, as described above.

Various additional modifications may be made to the illustrated embodiments without departing from the spirit and scope of the invention. The invention is therefore defined in the claims hereinafter appended.

What is claimed is:

1. A method of calibrating a photosensitive control for a light source, the method comprising:
   detecting an ambient light level with a resistive light detector coupled to a variable impedance circuit in a voltage divider circuit;
   communicating a variable voltage signal that varies with the resistance of the resistive light detector to a comparison circuit; and
   adjusting the variable impedance circuit in the voltage divider circuit to bias the variable voltage signal.

2. The method of claim 1, wherein detecting the ambient light level occurs while the light source is active, whereby at least a portion of the ambient light level detected while the light source is active is due to light generated by the light source.

3. The method of claim 1, further comprising activating the light source and delaying adjustment of the variable impedance circuit for a predetermined delay period after activation of the light source.

4. The method of claim 1, wherein the variable voltage signal is communicated to a first input of the comparison circuit, and wherein adjusting the variable impedance circuit comprises adjusting the variable impedance circuit until the variable voltage signal approximates a reference voltage signal provided to a second input of the comparison circuit.

5. The method of claim 4, further comprising adjusting the reference voltage signal based upon the detected ambient light level.

6. The method of claim 5, wherein adjusting the variable impedance circuit is performed prior to adjusting the reference voltage signal.

7. The method of claim 5, wherein the variable impedance circuit comprises a variable resistor, wherein adjusting the variable impedance circuit comprises selecting a resistance for the variable resistor, and wherein adjusting the reference voltage signal includes generating a reference voltage offset based upon the resistance selected for the variable resistor.

8. The method of claim 7, wherein the variable resistor comprises a digitally-controlled resistor where the resistance thereof is controlled by a count value, wherein adjusting the variable impedance circuit comprises adjusting the count value to bias the variable voltage signal.

9. The method of claim 8, wherein generating the reference voltage offset comprises selecting a voltage offset value from among a plurality of discrete voltage offset values using the count value of the digitally-controlled resistor.

10. The method of claim 9, wherein adjusting the reference voltage comprises adding the selected voltage offset value to a default reference voltage with an adder.

11. A method of controlling a light source, the method comprising, in response to a transition of the light source to a first activation state:
waiting for a predetermined delay period;
detecting an ambient light level with a photosensitive device coupled to a variable impedance circuit in a voltage divider circuit;
communicating a variable voltage signal that varies with the resistance of the photosensitive device to a comparison circuit;
adjusting the variable impedance circuit in the voltage divider circuit to bias the variable voltage signal;
after adjusting the variable impedance circuit, monitoring the ambient light level using the light detector; and
transitioning the light source from the first activation state to a second activation state in response to the biased variable voltage signal meeting a state transition threshold for the comparison circuit.

12. The method of claim 11, wherein the first state is an activated state and the second state is a deactivated state, the method further comprising resetting the variable impedance circuit to a default value responsive to transitioning the light source to the second activation state.

13. A circuit arrangement configured to control a light source, the circuit arrangement comprising:
a comparison circuit configured to compare a variable voltage signal to a reference voltage signal;
a voltage divider circuit coupled to the comparison circuit and configured to generate the variable voltage signal, the voltage divider circuit comprising a variable impedance circuit configured to be coupled to a photosensitive device; and
a calibration circuit configured to adjust the variable impedance circuit in the voltage divider circuit to bias the variable voltage signal responsive to an ambient light level detected by the light detector.

14. The circuit arrangement of claim 13, wherein the calibration circuit is configured to adjust the variable impedance circuit while the light source is active, whereby at least a portion of the ambient light level detected while the light source is active is due to light generated by the light source.

15. The circuit arrangement of claim 13, wherein the calibration circuit is further configured to delay adjustment of the variable impedance circuit for a predetermined delay period after activation of the light source.

16. The circuit arrangement of claim 13, wherein the calibration circuit comprises a processor.

17. An integrated circuit comprising the circuit arrangement of claim 13.

18. The circuit arrangement of claim 13, further comprising a control circuit configured to monitor the ambient light level using the light detector after adjustment of the variable impedance circuit, and transition the light source to a different activation state in response to the biased variable voltage signal meeting a state transition threshold for the comparison circuit.

19. The circuit arrangement of claim 18, wherein the control circuit is further configured to reset the variable impedance circuit to a default value responsive to transitioning the light source to the different activation state.

20. An apparatus comprising:
the circuit arrangement of claim 13; and
a light detector coupled to the voltage divider circuit of the circuit arrangement.

21. The apparatus of claim 20, further comprising a light source coupled to the circuit arrangement.

22. The apparatus of claim 20, further comprising a motion detector coupled to the circuit arrangement, wherein the circuit arrangement is further configured to selectively activate the light source responsive to movement detected by the motion detector.

23. The circuit arrangement of claim 13, wherein the variable voltage signal is communicated to a first input of the comparison circuit and the reference voltage signal is communicated to a second input of the comparison circuit, and wherein adjusting the variable impedance circuit comprises adjusting the variable impedance circuit until the variable voltage signal approximates the reference voltage signal.

24. The circuit arrangement of claim 23, wherein the calibration circuit is further configured to adjust the reference voltage signal based upon the detected ambient light level.

25. The circuit arrangement of claim 24, wherein the calibration circuit is configured to adjust the variable impedance circuit prior to adjusting the reference voltage signal.

26. The circuit arrangement of claim 24, wherein the variable impedance circuit comprises a variable resistor, wherein the calibration circuit is configured to adjust the variable impedance circuit by selecting a resistance for the variable resistor, and wherein the calibration circuit is configured to adjust the reference voltage signal by generating a reference voltage offset based upon the resistance selected for the variable resistor.

27. The circuit arrangement of claim 26, wherein the variable resistor comprises a digitally-controlled resistor where the resistance thereof is controlled by a count value, wherein the calibration circuit is configured to adjust the variable impedance circuit by adjusting the count value to bias the variable voltage signal.

28. The circuit arrangement of claim 27, wherein the calibration circuit is configured to generate the reference voltage offset by selecting a voltage offset value from among a plurality of discrete voltage offset values using the count value of the digitally-controlled resistor.

29. The circuit arrangement of claim 28, further comprising an adder configured to generate the reference voltage signal by adding the selected voltage offset value to a default reference voltage signal.

30. A method of calibrating a photosensitive control for a light source, the method comprising:

detecting an ambient light level with a photosensitive device coupled to a variable impedance circuit in a voltage divider circuit;

communicating a variable voltage signal that varies with the photosensitive light detector to a comparison circuit which adjusts the variable impedance circuit in the voltage divider circuit to bias the variable voltage signal upon a change in state.

31. The method of claim 30, wherein the variable voltage signal is communicated to a first input of the comparison circuit, and wherein adjusting the variable impedance circuit comprises adjusting the variable impedance circuit until the variable voltage signal approximates a reference voltage signal provided to a second input of the comparison circuit.

32. The method of claim 31, further comprising adjusting the reference voltage signal based upon the detected ambient light level upon a change in state of the light source.

33. The method of claim 32, wherein a change to the variable impedance circuit is a result of adjusting the reference voltage signal.

* * * * *